United States Patent [19]

Lesquir et al.

[11] Patent Number: 5,054,820
[45] Date of Patent: Oct. 8, 1991

[54] CONNECTOR FOR SAP COLLECTING SYSTEM

[75] Inventors: Dominique Lesquir, Rockland; Bernard Landry, St Foy, both of Canada

[73] Assignee: IPL, Inc., Quebec, Canada

[21] Appl. No.: 434,211

[22] Filed: Nov. 13, 1989

[51] Int. Cl.⁵ .................................... F16L 41/00
[52] U.S. Cl. ............................ 285/197; 47/52
[58] Field of Search .................... 47/50-54; 285/197-199, 921

[56] References Cited

U.S. PATENT DOCUMENTS

| | | | |
|---|---|---|---|
| 1,036,674 | 8/1912 | Meurling | 285/197 |
| 3,132,881 | 5/1964 | Corey | 285/197 |
| 3,161,210 | 12/1964 | Loof | 285/921 |
| 3,218,093 | 11/1965 | Carlson | 285/197 |
| 3,870,348 | 3/1975 | Hawkins | 285/197 |
| 3,933,170 | 1/1976 | Olson | 285/197 |
| 4,073,513 | 2/1978 | Blakeley | 285/197 |
| 4,128,918 | 12/1978 | Wenk | 285/921 |
| 4,306,740 | 12/1981 | Kleylamp et al. | 285/921 |
| 4,316,622 | 2/1982 | Nelson | 285/197 |
| 4,462,620 | 7/1984 | Bambenek et al. | 285/921 |
| 4,523,668 | 8/1985 | Logsdon | 285/197 |
| 4,884,365 | 12/1989 | Lesquir | 47/52 |
| 4,887,387 | 12/1989 | Lesquir | 47/52 |
| 4,926,597 | 5/1990 | Landry | 47/50 |

*Primary Examiner*—Henry E. Raduazo
*Attorney, Agent, or Firm*—Longacre & White

[57] ABSTRACT

The disclosure herein describes a connector for use in a network of mains and tubes for directing sap collected from trees to a central sap-processing unit. The connector, which is used for conveying sap from a tube to a main, frist comprises a clip for encircling the main. The clip consists of a separatable band having interlockable ends which are so shaped as to draw the band onto the main when interlocking is carried out. The connector also comprises a sap conveying member which is rotatably engaged in an opening defined in the band, the conveying member having one end adapted to penetrate a pre-pierced hole in the main. The conveying member is rotatably orientable with respect to the clip and to the main for connection with tubes having varying angles relative to the axis of the main.

10 Claims, 1 Drawing Sheet

U.S. Patent     Oct. 8, 1991     5,054,820

CONNECTOR FOR SAP COLLECTING SYSTEM

FIELD OF THE INVENTION

The present invention relates to a connector for conveying sap from a tube, forming part of a network of mains and tubes, to a main which, in turn, conveys sap to a central processing unit.

BACKGROUND OF THE INVENTION

Various connectors are used for mounting tubes to mains in a sap collecting and conveying network which extends between maples trees and a central sap-processing unit.

One such connector, for example, consists of two semi-cylindrical elements, each having opposite threaded end portions, which are mounted in encircling relationship over the outer wall of a main and which are held together through thread-engaging securing means. It has been found that the mounting and dismounting of these semi-cylindrical elements are cumbersome and difficult due to weather conditions on the securing means or to the presence of dirt or other particles which become lodged between the connecting and connected parts.

Another connecting method consists in severing the main and inserted the cut ends into or over a joining member. The latter includes a series of integrally and fixedly mounted tube connecting extensions. With this type of connector, it has been noted that the angle of these fixed integral extensions is not always that of the tubes arriving from trees. Therefore, the tubes must be bent in order to engage coaxially the extensions resulting, in some cases, in braking the tubes or partially blocking them due to the bends. Also, with this type of connector, a cap is needed for all the extensions not being used.

Furthermore, some of the connectors presently used have their lower ends extending within the main, thus obstructing the flow of sap in the conduit.

OBJECTS AND STATEMENT OF THE INVENTION

It is an object of the present invention to provide a connector for mounting sap collecting tubes to mains of a sap collecting network. This is achieved by the combination of a clip member which is adapted to be quickly mounted to or dismounted from a main and of a sap conveying member which is mounted to the clip member and is rotatably orientable to allow for various angles of tube connections.

The present invention therefore relates to a connector for conveying sap from a tube to a main, which comprises:
clip means for encircling the main; the clip means including a separable band having interlockable ends, the ends being so shaped as to draw the band onto the main while being interlocked; the band defining an opening at an intermediate section thereof;
sap conveying means rotatably engaged in the clips opening; the conveying means having one end adapted to engage the tube and an opposite end adapted to penetrate into a pre-pierced hole in the main; and
cooperating means between the clip means and the conveying means at the intermediate section of the band allowing the conveying means to be rotatably orientable relative to the main.

In one preferred form of the invention, the cooperating means include a sealing ring which is made of compressible material and is disposed between the main and the band, the ring being compressed when the interlockable ends are drawn one into the other.

In another form of the invention, the interlockable ends consist of a tongue provided with serrations thereon and of a pair of radially spaced jaws receiving the tongue therebetween with one of the jaws being provided with serrations thereon for engaging the tongue serrations.

In another form of the invention, the serrations are so shaped as to prevent separation between the tongue and the jaws in the longitudinal direction of the band while allowing easy separation in a lateral direction of the band.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

DESCRIPTION OF PREFERRED EMBODIMENTS

Figure 1:
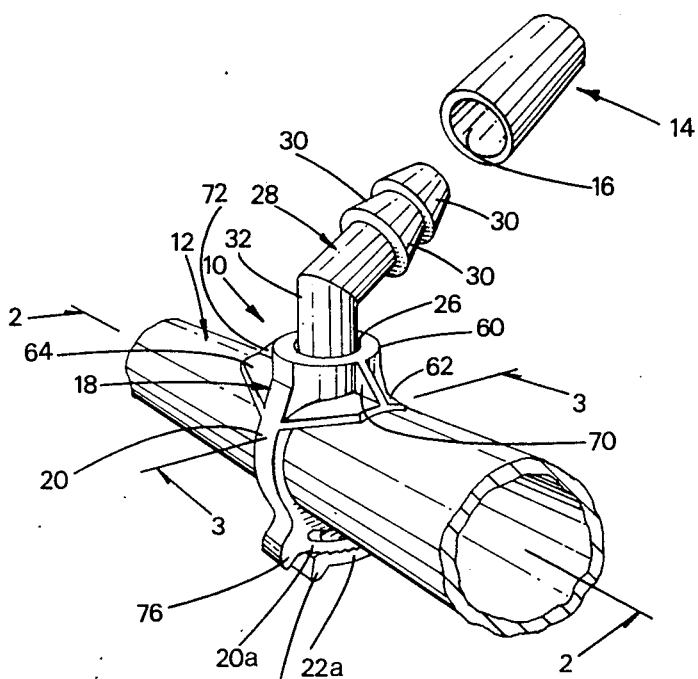
FIG. 1 is a perspective view of a connector made in accordance with the present invention, being mounted on a main for connection with a tube.

Referring to FIG. 1, there is shown a connector, generally denoted 10, being mounted on a main 12 of a sap collecting network (not shown) which is used to collect and conduct sap collected from maple trees to a central processing unit. The collected sap is brought to mains such as 12 by means of a series of tubes (one of which is shown as 14) which have one end (not shown) mounted to a tap secured to a maple tree and an opposite end 16 adapted to be tightly fitted to a connector, such as connector 10 of the present invention.

Figure 4:
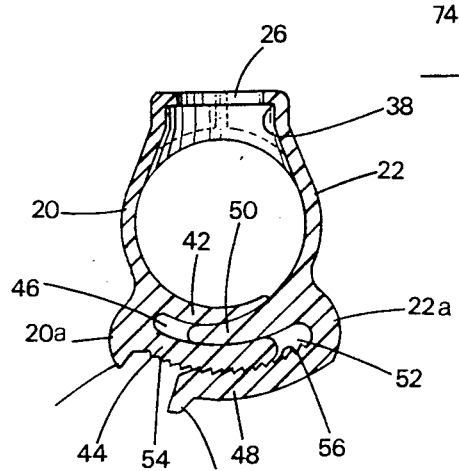
FIG. 4 is a cross-sectional view taken along a transverse axis of the clip.
Figure 2:
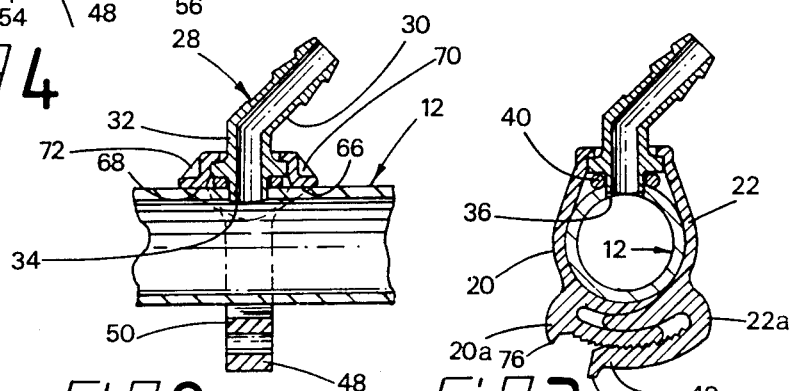
FIG. 2 is a cross-sectional view taken along lines 2—2 of FIG. 1.
Figure 3:
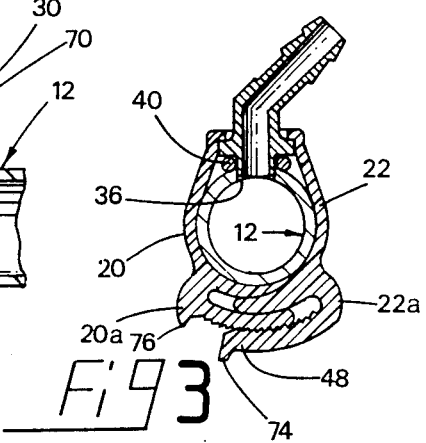
FIG. 3 is a cross-sectional view taken along lines 3—3 of FIG. 1.

Referring to FIGS. 2, 3 and 4, connector 10 first comprises a clip member 18 which is adapted to be clamped onto the main 12 in an encircling manner. The clip 18 is in the form of a band having a pair of opposite arm portions 20, 22 each having interlockable ends 20a, 22a, respectively. An intermediate section of the clip member has a circular opening 26.

The connector 10 further comprises a sap conveying member 28 which has a first cylindrical portion 30 displaying, on the outer face thereof, a pair of successive cone-shaped portions 30a and 30b adapted to fit into the open end 16 of the tube 14. The conveying member 28 has a second cylindrical portion 32 which downwardly extends through opening 26 of the clip member, its lower end 34 penetrating into a pre-pierced hole 36 in the main 12. The lower end 34, however, is flush with the inner wall of the main so as to avoid obstruct in the sap flow.

The opening 26 of the band has a recessed area 38 (see FIG. 4) in which is received a compressible a sealing 0-ring 40, the function of which will be described hereinbelow.

The end 20a of the band is composed of a pair of tongues 42 and 44 defining a jaw 46 while the other end 22a of the band is also composed of a pair of tongues 48 and 50 defining a jaw 52. The lower face of tongue 44 and the upper face of tongue 48 are provided with respective serrations 54 and 56 which are adapted to engaged one another to close the arm portions 20 and 22 of the band. These serrations are shaped so that they provide a tight engagement in the longitudinal direction, i.e. in a direction including the band portions (or perpendicular to the axis of the main 12); however, they provide easy disengagement in the lateral direction of the band, i.e. in the direction of the axis of the main 12.

The shape of the jaws 46 and 52 is also determined so as to cause a compression of the sealing ring 40 when they are caused to inter-engage with their associated portions 50 and 44.

In addition to provide sealing, the 0-ring 40 allows the member 28 to be rotated and orientable with respect to the main 12.

To prevent the clip member 18 to rotate about a vertical axis, the intermediate upper part 60 of the clip further includes a pair of opposite extensions 62, 64 each having an arcuate main engaging surface 66, 68 with a reinforcing rib 70, 72.

Further, to assist in the clamping operation of the clip member, finger-engaging portions 74, 76 are provided on each arm 20, 22.

Although the invention has been described above with respect to one specific form, it will be evident to the person skilled in the art that it may be refined and modified in various ways. For example, the axis of portion 30 of collector 28 relative to the axis of portion 34 penetrating the main 12 may be varied. It is therefore wished to have it understood that the present invention should not be limited in interpretation, except for the terms of the following claims.

The embodiments of the invention in which an exclusive property or privilege is claimed are defined as follows:

1. For use with a network of mains and tubes for directing sap collected from trees to a central sap-processing unit, a connector for conveying sap from a tube to a main, comprising:

clip means for encircling said main; said clip means including a separatable band having interlockable ends, said ends being so shaped as to draw said band onto said main while being interlocked; said band defining an opening at an intermediate section thereof and first cooperating means adjacent said opening; and sap conveying means having one end adapted to engage said tube and an opposite end adapted to penetrate a pre-pierced hole in said main; second cooperating means adjacent to said opposite end and freely engaging said first cooperating means to allow said sap conveying means to be freely rotated (in) relative to said clip means when said clip means is mounted to said main and said opposite end of said sap conveying means is received in said pre-pierced hole of said main whereby said sap conveying means may be 360° orientable relative to a vertical axis extending through said opening to allow for various angles of tube connections.

2. A connector as defined in claim 1, wherein said cooperating means include a sealing ring made of compressible material and is disposed between said main and said intermediate section of said band; said sealing ring being compressed when said interlockable ends are drawn one into the other.

3. A connector as defined in claim 2, wherein said interlockable ends consist of a tongue provided with serrations thereon and of a pair of radially-spaced jaws receiving said tongue therebetween; one of said jaws being provided with serrations thereon for engaging the serrations of said tongue.

4. A connector as defined in claim 3, wherein said serrations on said tongue and on said one jaw are so shaped as to prevent separation in a longitudinal direction of said band but allowing separation in a lateral direction of said band.

5. A connector as defined in claim 1, wherein said clip means and said conveying means are made of plastic material.

6. A connector as defined in claim 2, wherein said conveying means include a cylindrical portion having a shoulder area at one end thereof with an outer diameter greater than that of said opening of said intermediate section of said band; said sealing ring being disposed between said shoulder area and said main over the pre-pierced hole in the main.

7. A connector as defined in claim 1, wherein said intermediate section includes a pair of opposite arcuate surfaces for engaging the outer wall of said main and to prevent said clip member to rotate about a vertical axis perpendicular to the axis of said main.

8. A connector as defined in claim 1, further comprising finger-engaging means adjacent each interlockable end of said band.

9. A connector as defined in claim 1 wherein said sap conveying means consists of a hollow member including a first cylindrical portion adapted to be connected to a tube and a second cylindrical portion adapted to be mounted to said intermediate section of said clip means in said pre-pierced hole.

10. A connector as defined in claim 9 wherein said second cylindrical portion has the end thereof in said hole flush with the inner wall of said main.

* * * * *